United States Patent
Ananda et al.

(10) Patent No.: US 10,771,560 B2
(45) Date of Patent: Sep. 8, 2020

(54) BAND SCAN FOR NARROWBAND COMMUNICATIONS

(71) Applicant: QUALCOMM INCORPORATED, San Diego, CA (US)

(72) Inventors: Raghavendra Shyam Ananda, Hyderabad (IN); Srikanth Menon, Hyderabad (IN); Ganesh Nagamani, Hyderabad (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/255,435

(22) Filed: Jan. 23, 2019

(65) Prior Publication Data

US 2020/0236173 A1  Jul. 23, 2020

(51) Int. Cl.
  *H04W 72/04* (2009.01)
  *H04L 29/08* (2006.01)
  *H04L 27/00* (2006.01)
  *H04W 48/10* (2009.01)
  (Continued)

(52) U.S. Cl.
  CPC .......... *H04L 67/12* (2013.01); *H04B 17/318* (2015.01); *H04L 27/0006* (2013.01); *H04W 48/10* (2013.01); *H04W 56/001* (2013.01); *H04W 72/0453* (2013.01)

(58) Field of Classification Search
  CPC .... H04B 17/318; H04W 48/10; H04W 48/16; H04W 56/001; H04W 72/06; H04W 72/048; H04W 72/0453; H04L 5/0007; H04L 27/0006; H04L 67/12
  See application file for complete search history.

(56) References Cited

U.S. PATENT DOCUMENTS

| | | | | |
|---|---|---|---|---|
| 2011/0117911 A1* | 5/2011 | Narang | ................. | H04W 48/16 455/434 |
| 2014/0038587 A1* | 2/2014 | Murgan | ................. | H04W 48/16 455/422.1 |
| 2017/0290075 A1* | 10/2017 | Carbajal | ........... | H04W 72/0453 |

(Continued)

OTHER PUBLICATIONS

Benedetto F., et al., "Detection of Hidden Users in Cognitive Radio Networks", 2013 IEEE 24th International Symposium on Personal, Indoor and Mobile Radio Communications: Mobile and Wireless Networks, 2013, pp. 2296-2300.

(Continued)

*Primary Examiner* — Thanh C Le
(74) *Attorney, Agent, or Firm* — Changwoo Yang

(57) ABSTRACT

A user equipment (UE) performs wireless communication by starting a scan of an absolute radio frequency channel number (ARFCN) configured for performing a narrowband communication. The UE determines, based on a spectral characteristic of a phase of a signal in the ARFCN, whether a cellular communication is deployed in the ARFCN. The UE may then terminate the scan of the ARFCN in response to the spectral characteristic of the phase of the signal in the ARFCN indicating that the cellular communication is deployed in the ARFCN. Alternatively, the UE may proceed with a synchronization signal search on the ARFCN in response to the spectral characteristic of the phase of the signal in the ARFCN indicating that the cellular communication is not deployed in the ARFCN.

20 Claims, 13 Drawing Sheets

(51) Int. Cl.
　　*H04B 17/318*　　(2015.01)
　　*H04W 56/00*　　(2009.01)

(56) References Cited

U.S. PATENT DOCUMENTS

2018/0317231 A1* 11/2018 Wang ............... H04L 27/0006
2019/0090293 A1*　3/2019 Su ..................... H04W 56/0015
2019/0208112 A1*　7/2019 Kleinbeck ................ G01S 3/00

OTHER PUBLICATIONS

Huawei, et al., "Discussion and Text Proposal on the ARFCN in NR (ASN.1 H297)", 3GPP Draft, R2-1803381, Discussion and Text Proposal on the ARFCN in NR (ASN.1 H297), 3rd Generation Partnership Project (3GPP), Mobile Competence Centre, 650, Route Des Lucioles, F-06921 Sophia-Antipolis, vol. RAN WG1, No. Athens, Greece, Feb. 26, 2018-Mar. 3, 2018, Feb. 21, 2018 (Feb. 21, 2018), XP051400804, 5 pages, Retrieved from the Internet: URL: http://www.3gpp.org/ftp/tsg%5Fran/WG2%5FRL2/TSGR2%5F101/Docs/. [retrieved on Feb. 21, 2018] section 2.

Huawei, et al., "Remaining Issues on Bandwidth Part and Wideband Operation", 3GPP Draft, R1-1805892, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441111, 7 pages, Retrieved from the Internet: URL: http://www.3gpp.org/ftp/Meetings%5F3GPP%5FSYNC/RAN1/Docs/. [retrieved on May 20, 2018] section 2.

International Search Report and Written Opinion—PCT/US2020/013036—ISA/EPO—dated Apr. 21, 2020.

Sequans Communications: "Inter-RAT Selection Triggering for Nb-IoT", 3GPP Draft, R2-1817502, NB-IoT Inter-Rat, 3rd Generation Partnership Project (3GPP), Mobile Competence Centre, 650, Route Des Lucioles, F-06921 Sophia-Antipolis Cedex, France, Vol. RAN WG1, No. Spokane, USA, Nov. 12, 2018-Nov. 16, 2018, Nov. 12, 2018 (Nov. 12, 2018), XP051557028, 4 pages, Retrieved from the Internet: URL: http://www.3gpp.org/ftp/Meetings%5F3GPP%5FSYNC/RAN2/Docs/R2%2D1817502%2Ezip. [retrieved on Nov. 12, 2018] section 2; figure 2.

* cited by examiner

1700

1702
Calculating a first order difference of the phase of the signal based on baseband samples

1704
Obtaining a product of a conjugate of each sample with a previous sample

1706
Wrapping the first order difference of the phase of the signal

1708
Wrapping the first order difference of the phase of the signal to an area between $-\pi$ and $+\pi$

1710
Calculating the second order difference of the phase of the sign

1712
Applying a frequency domain filter to the wrapped first order difference of the phase of the signal

1714
Calculating an average over a number of samples of the square of the second order difference of the phase of the signal in the ARFCN

1716
Comparing the average with a threshold

1720
Deciding that the cellular communication is deployed in the ARFCN in response to the average being smaller than the threshold

1718
Deciding that the cellular communication is not deployed in the ARFCN in response to the average being equal to or larger than the threshold

FIG. 17

BAND SCAN FOR NARROWBAND COMMUNICATIONS

BACKGROUND

The present disclosure relates generally to communication systems, and more particularly, to narrowband communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a smaller frequency bandwidth as compared to the frequency bandwidth used for LTE communications. Narrowband communications may reduce device complexity, enable multi-year battery life, and provide deeper coverage to reach challenging locations such as deep inside buildings. An example of narrowband communication is enhanced machine-type communication (eMTC), which in some cases may be limited to six resource blocks (RBs) of system bandwidth, e.g., 1.08 MHz. Another example of narrowband communication is narrowband (NB) IoT (NB-IoT) communication, which may be limited to a single RB of system bandwidth, e.g., 180 kHz.

NB-IoT is a technology standardized by the 3GPP standards body for narrowband radio technology specially designed for the IoT. Special focuses of this standard include indoor coverage, lower cost, longer battery life, and larger number of devices. The NB-IoT technology may be deployed "in-band," utilizing resource blocks within, for example, normal LTE spectrum or Global System for Mobile communications (GSM) spectrum. In addition, NB-IoT may be deployed in the unused RBs within a guard band of an LTE carrier, or "standalone" for deployments in dedicated spectrum. Since the narrow bandwidth of NB-IoT may overlap a wider bandwidth of another communication, such as GSM, there is a need for fast and efficient band scan for narrowband communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a user equipment (UE) includes starting a scan of an absolute radio frequency channel number (ARFCN) configured for performing a narrowband communication. The method may further include determining, based on a spectral characteristic of a phase of a signal in the ARFCN, whether a cellular communication is deployed in the ARFCN. The method may further include terminating the scan of the ARFCN in response to the spectral characteristic of the phase of the signal in the ARFCN indicating that the cellular communication is deployed in the ARFCN. The method may further include proceeding with a synchronization signal search on the ARFCN in response to the spectral characteristic of the phase of the signal in the ARFCN indicating that the cellular communication is not deployed in the ARFCN.

In a further aspect, a UE for wireless communication includes a memory and at least one processor coupled to the memory and configured to start a scan of an ARFCN configured for performing a narrowband communication. The at least one processor may further be configured to determine, based on a spectral characteristic of a phase of a signal in the ARFCN, whether a cellular communication is deployed in the ARFCN. The at least one processor may further be configured to terminate the scan of the ARFCN in response to the spectral characteristic of the phase of the signal in the ARFCN indicating that the cellular communication is deployed in the ARFCN. The at least one processor may further be configured to proceed with a synchronization signal search on the ARFCN in response to the spectral characteristic of the phase of the signal in the ARFCN indicating that the cellular communication is not deployed in the ARFCN.

In yet another aspect, a computer-readable medium stores computer executable code, including code to start a scan of an ARFCN configured for performing a narrowb and communication. The computer executable code may further include code to determine, based on a spectral characteristic of a phase of a signal in the ARFCN, whether a cellular communication is deployed in the ARFCN. The computer executable code may further include code to terminate the scan of the ARFCN in response to the spectral characteristic of the phase of the signal in the ARFCN indicating that the cellular communication is deployed in the ARFCN. The computer executable code may further include code to and proceed with a synchronization signal search on the ARFCN in response to the spectral characteristic of the phase of the signal in the ARFCN indicating that the cellular communication is not deployed in the ARFCN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 17 is a flowchart of an example method of cellular cell presence detection, according to some aspects.

DETAILED DESCRIPTION

Figure 1:
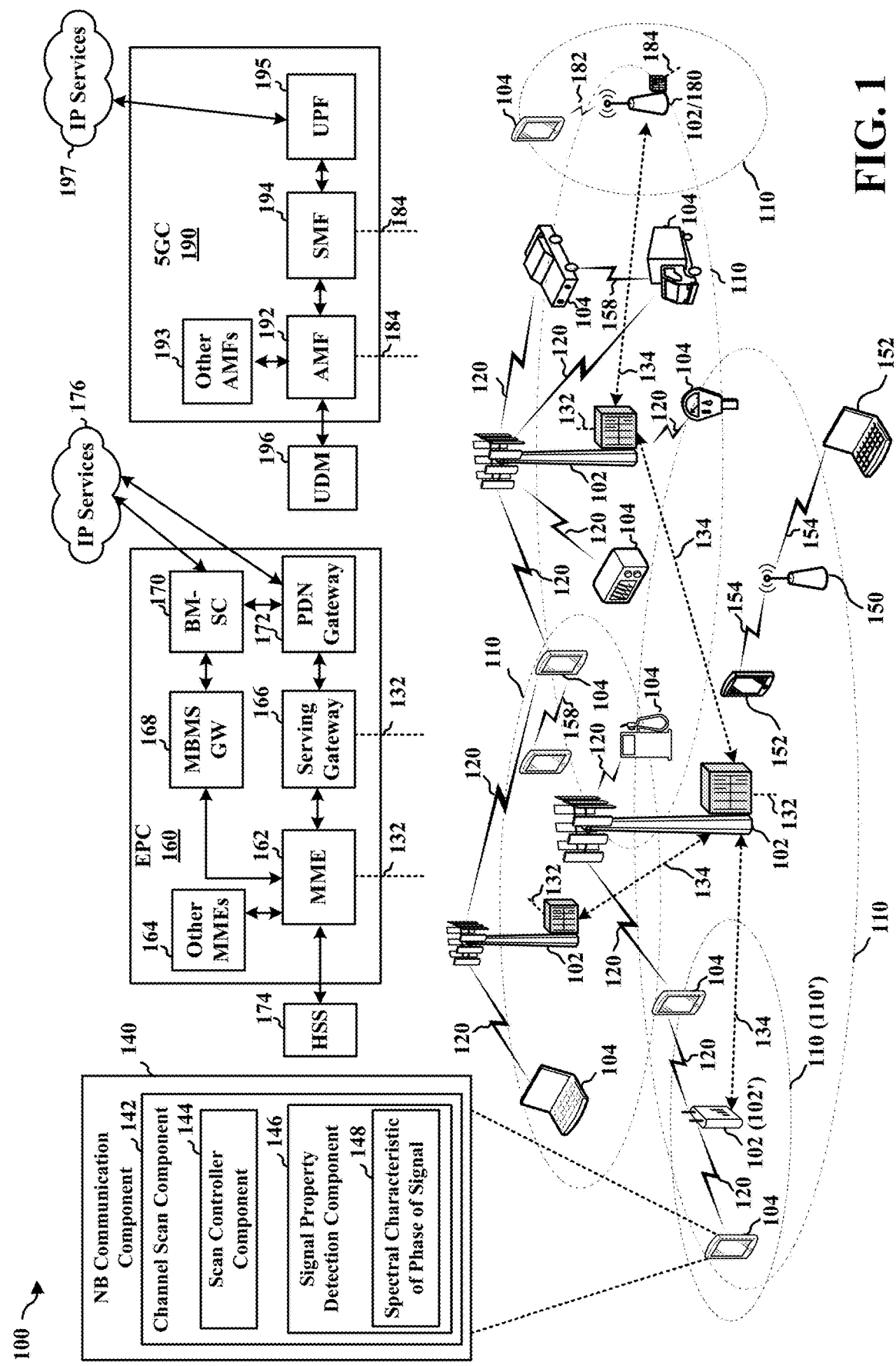
FIG. 1 is a diagram illustrating an example of a wireless communications system and an access network, including a user equipment (UE) configured for narrowband communication, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In an aspect, the synchronization signal acquisition required for narrowband communication may take a relatively long time, e.g., up to 500 ms, due to the large number of synchronization signal accumulations needed. When a GSM cell is present in a band, the lengthy synchronization signal search on that band may fail. As such, the band scan may be performed more efficiently if the presence of the GSM cell was detected quickly. However, a narrowband communication cell and a GSM cell with a similar bandwidth may not be differentiated from each other by a conventional power scan, and a UE may eventually need a synchronization signal search to distinguish between the two cells. In this case, a failed synchronization signal search may cause the UE to incur considerable power consumption and acquisition delay.

However, aspects of the present disclosure allow a UE to exploit cellular signal properties, such as GSM signal properties, to more quickly detect the presence of a GSM cell deployed in a same band as a narrowband communication cell. In some present aspects, a user equipment (UE) may start a scan of an absolute radio frequency channel number (ARFCN) configured for narrowband communication, detect a signal in the ARFCN, and determine, and based on a spectral characteristic of a phase of the signal, such as a second order difference of the phase, whether a cellular communication is deployed in the ARFCN. The UE may then proceed with a synchronization signal search on the ARFCN if the spectral characteristic of the phase of the signal indicates that a cellular communication is not deployed in the ARFCN. Alternatively, the UE may terminate the scan of the ARFCN if the spectral characteristic of the phase of the signal indicates that a cellular communication is deployed in the ARFCN. Subsequent to the termination of the scan of the ARFCN, the UE may start another scan of another ARFCN configured for narrowband communication. Accordingly, the UE may avoid or substantially reduce the power consumption and the acquisition delay that would be incurred due to any failed synchronization signal searches in the ARFCN. For example, since PSS/SSS acquisition may need at least 30 ms over the air (OTA) measurement time, the presently described technique of quickly detecting the presence of a GSM signal may save power and reduce acquisition delay at a UE.

Referring to FIG. 1, an example of a wireless communications system and an access network 100 includes a UE 104 that implements a narrowband communication component 140 configured for supporting narrowband communications between the UE 104 and a base station 102, such as a small cell 102'. Specifically, the narrowband communication component 140 may include a channel scan component 142 configured to scan an absolute radio frequency channel number (ARFCN) for narrowband communication. The channel scan component 142 may include a scan controller component 144 configured to determine whether a cellular communication is deployed in the scanned channel, and if so, abort a synchronization signal search on the ARFCN and try a different ARFCN for narrowband communication. In an aspect, the channel scan component 142 may include a signal property detection component 146 configured to detect the presence of the cellular communication based on a spectral characteristic of a phase of a signal 148 detected in the ARFCN. For example, for a GSM cellular communication, the detected spectral characteristic 148 may be a second order difference of the phase of the signal in the ARFCN. Further details of the functionality of the narrowband communication component 140 are described below with reference to FIGS. 3-18.

Still referring to FIG. 1, the wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cells and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
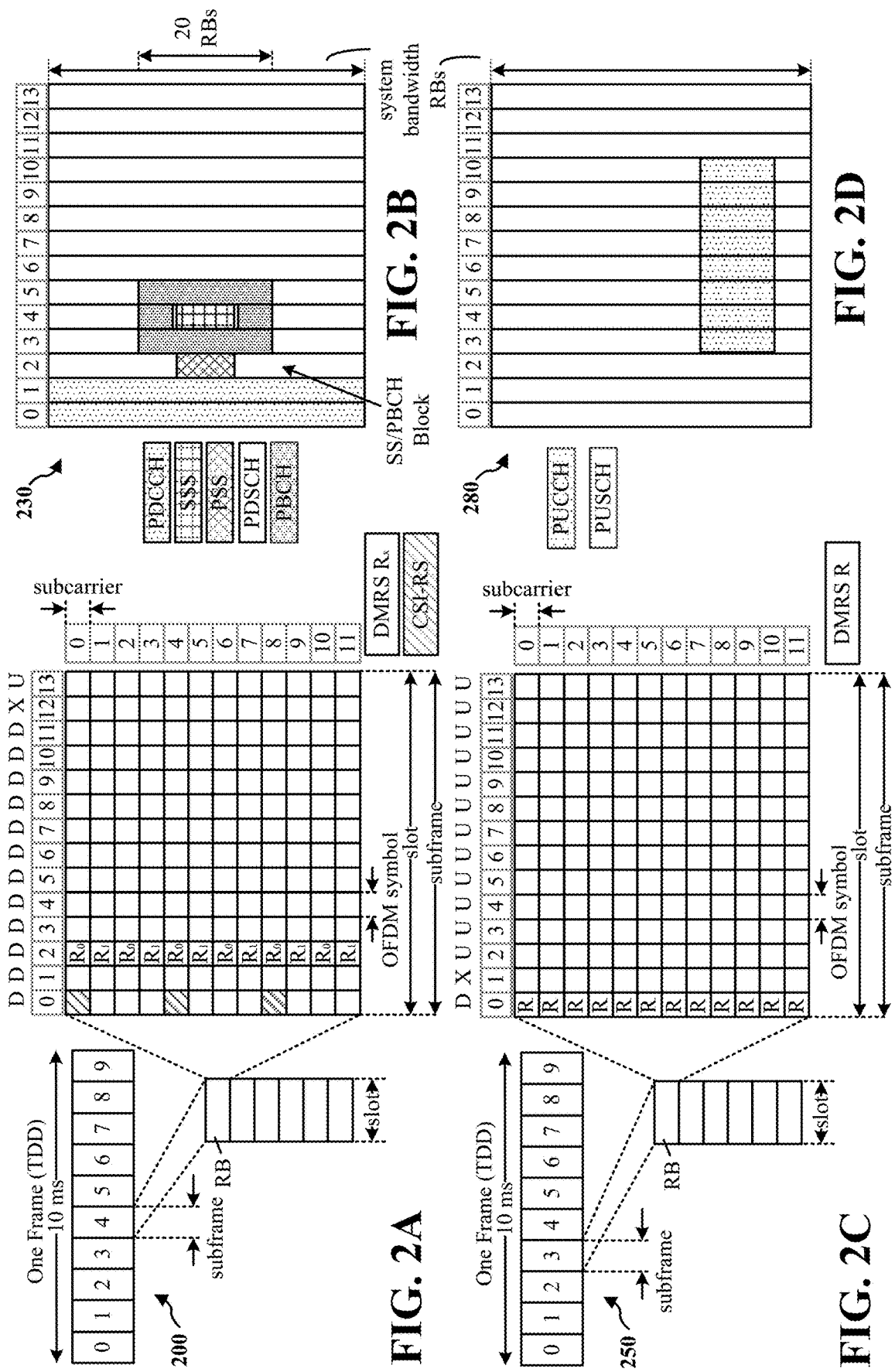
FIGS. 2A, 2B, 2C, and 2D are format diagrams of examples of a first 5G/NR frame, DL channels within a 5G/NR subframe, a second 5G/NR frame, and UL channels within a 5G/NR subframe, respectively, according to some aspects.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Referring back to FIG. 1, the small cell 102' may be an NB-IoT cell that can be deployed in various modes. For example, an NB-IoT cell may be deployed in an in-band mode, e.g., along with a cellular communication cell such as an LTE cell. Alternatively, an NB-IoT cell may be deployed in a guardband mode or in a standalone mode. Compared to other deployment modes, deploying an NB-IoT cell in a standalone mode may provide the highest maximum coupling loss (MCL), the highest possible transmit power, and the maximum coverage. In contrast, deploying an NB-IoT cell in a low band such as 800/900 MHz may incur lower path loss. However, a GSM cell may also be deployed in such a low band, thus prohibiting NB-IoT communication in the low band.

In an aspect, for example, the small cell 102' may be an NB-IoT cell that is deployed along with GSM cells in the standalone mode. In this case, the UE 104 may execute a band scan in the NB-IoT cell in order to perform narrowband communication. In an aspect, for example, the band scan may detect an NB-IoT signal with an SNR as weak as −12.6 dB, with a high detection probability such as 99%. The band scan may be performed over a number of ARFCNs, such as a number of E-UTRA ARFCNs (EARFCNs), which are configured for narrowband communication. Each ARFCN/EARFCN unambiguously identifies the central frequency of the carrier on which the small cell 102' may be broadcasting, and the corresponding band scan may scan a narrow bandwidth, e.g., ~200 kHz, around the central frequency identified by the ARFCN/EARFCN.

In an aspect, the synchronization signal acquisition required for narrowband communication in an ARFCN/

EARFCN may take a relatively long time, e.g., up to 500 ms, due to the large number of synchronization signal accumulations needed. When a GSM cell is present in an ARFCN/EARFCN, the lengthy synchronization signal search on that ARFCN/EARFCN may fail. As such, the band scan may be performed more efficiently if the presence of the GSM cell was detected quickly. However, an NB-IoT cell and a GSM cell with a similar bandwidth may not be differentiated from each other by a conventional power scan, and the UE 104 may eventually need a synchronization signal search to distinguish between an NB-IoT cell and a GSM cell deployed in a same ARFCN/EARFCN. In this case, a failed synchronization signal search may cause the UE 104 to incur considerable power consumption as well as acquisition delay. The power consumption and the acquisition delay may even be larger when there are multiple GSM cell deployed along with the NB-IoT cell.

However, aspects of the present disclosure allow the UE 104 to exploit cellular signal properties, such as GSM signal properties, to more quickly detect the presence of a GSM cell deployed in a same ARFCN/EARFCN as an NB-IoT cell. Accordingly, the UE 104 may avoid or substantially reduce the power consumption and the acquisition delay that would be incurred due any to failed synchronization signal searches in the NB-IoT cell. In an aspect, the NB-IoT bands that have overlap with GSM bands may be known to the UE 104 a priori, i.e., beforehand. In this case, in response to identifying that the UE 104 is scanning an NB-IoT ARFCN/EARFCN which overlaps a GSM band, the UE 104 may perform the techniques described herein to determine the presence of a GSM deployment while attempting a synchronization signal search, e.g., a primary synchronization signal (PSS) scan or a secondary synchronization signal (SSS) scan. If the UE 104 detects a GSM cell on an ARFCN/EARFCN, the UE 104 may abort the PSS/SSS scan on that ARFCN/EARFCN. Accordingly, since PSS/SSS acquisition may need at least 30 ms over the air (OTA) measurement time, the presently described technique of quickly detecting the presence of a GSM signal may save power and reduce acquisition delay at the UE 104.

In an aspect, for example, in the narrowband communication component 140 of the UE 104, the channel scan component 142 may scan an ARFCN to determine whether a GSM cell is deployed. In an aspect, for example, the signal property detection component 146 of the channel scan component 142 may detect the presence of the GSM cell by exploiting the properties of Gaussian Minimum Shift Keying (GMSK) modulation used in GSM. For example, the signal property detection component 146 may detect the presence of the GSM cell based on the second order difference of a phase of a signal detected in the ARFCN. In these aspects, the signal property detection component 146 may do so by implementing a low-complexity algorithm that does not require slot/frame synchronization with the GSM cell and is resilient to any unknown frequency offsets, as described below at least with reference to FIGS. 8-17. Such low complexity algorithm may need less than 1 ms of OTA measurement time, and may be resilient to large adjacent channel interference (ACI) and/or co-channel interference (CCI) signals where a GSM cell may operate.

Figure 3:
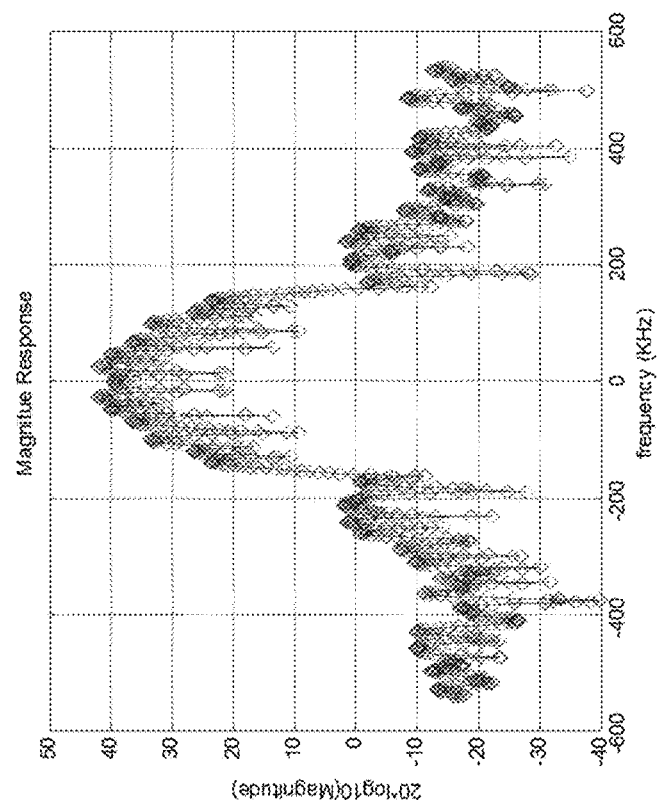
FIG. 3 is a graph of magnitude (in decibels) with respect to frequency (in KHz) for an example magnitude response corresponding to continuous phase modulation, according to some aspects.

In an aspect, for continuous phase modulation of a signal "q(t)" using a carrier of amplitude "$A_0$" and frequency "$f_0$," the modulated signal "m(t)" may be represented as:

$$m(t) = A_0 \cos(2\pi f_0 t + \varphi(t))$$

where "φ(t)" is the instantaneous phase:

$$\varphi(t) = 2\pi h \sum_{k=-\infty}^{+\infty} \alpha_k q(t - kT)$$

where "h" is a constant and "$\alpha_k$" is the weight given to the $k^{th}$ sample of the signal "q(t)" when sampled at a sampling rate of "1/T." FIG. 3 includes an example magnitude response 300 of the above continuous phase modulation in decibels as a function of frequency in kHz.

Figure 4:
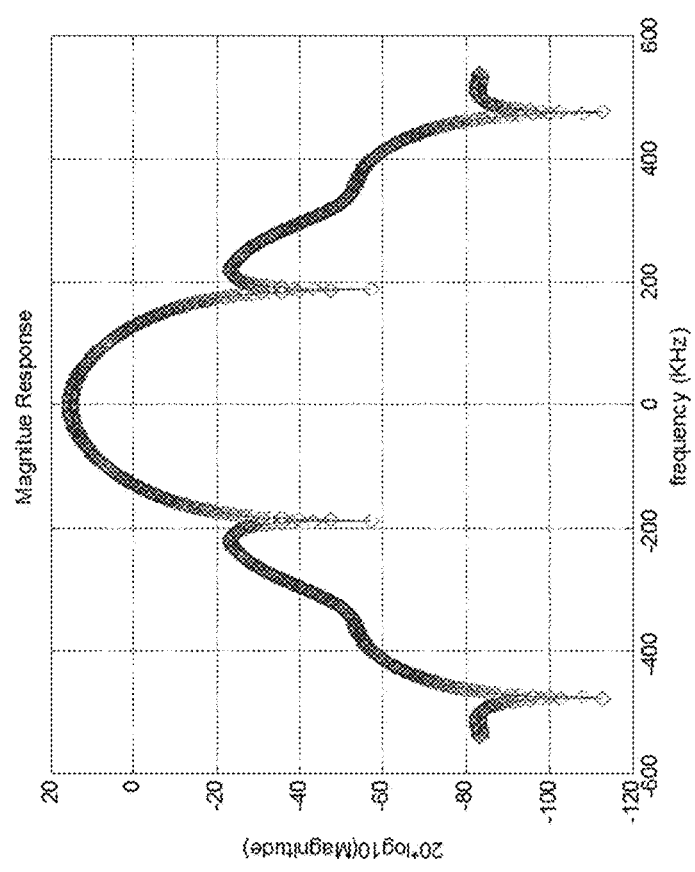
FIG. 4 is a graph of magnitude (in decibels) with respect to frequency (in KHz) of an example magnitude response corresponding to Gaussian Minimum Shift Keying (GMSK) modulation, according to some aspects.

In particular, in GMSK modulation using a Gaussian pulse "g(u)":

$$q(t) = \int_0^t g(u)\,du$$

$$g(t) = rect_T\left(t - \frac{T}{2}\right) * b(t)$$

$$b(t) = \sqrt{\frac{2\pi}{\ln(2)}}\, B \exp\left(-\frac{2\pi^2 B^2}{\ln(2)} t^2\right)$$

where "B" is a constant. FIG. 4 includes an example magnitude response 400 of the above GMSK modulation in decibels as a function of frequency in kHz.

Accordingly, the GMSK phase "φ(t)" may be written as a function of the integrated Gaussian pulse $$\text{"}\int_{-\infty}^{t-kT} g(u)\,du\text{"}$$

as:

$$\phi(t) = \frac{\pi}{2} \sum_{k=-\infty}^{k=\infty} \alpha[k] \int_{-\infty}^{t-kT} g(u)\,du$$

Figure 5:
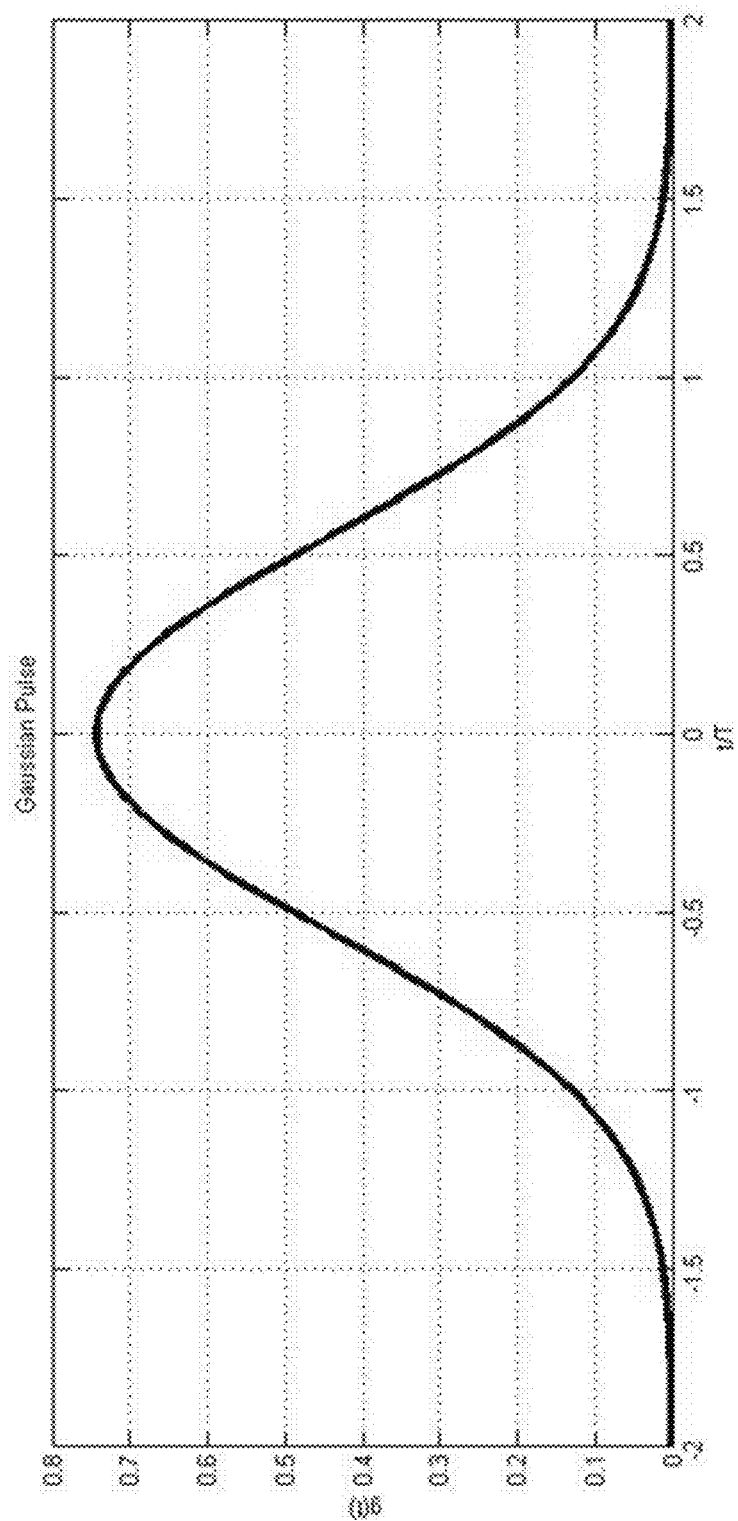
FIG. 5 is a graph of amplitude with respect to time (in sampling rate units) for an example Gaussian pulse, according to some aspects.
Figures 6, 7:
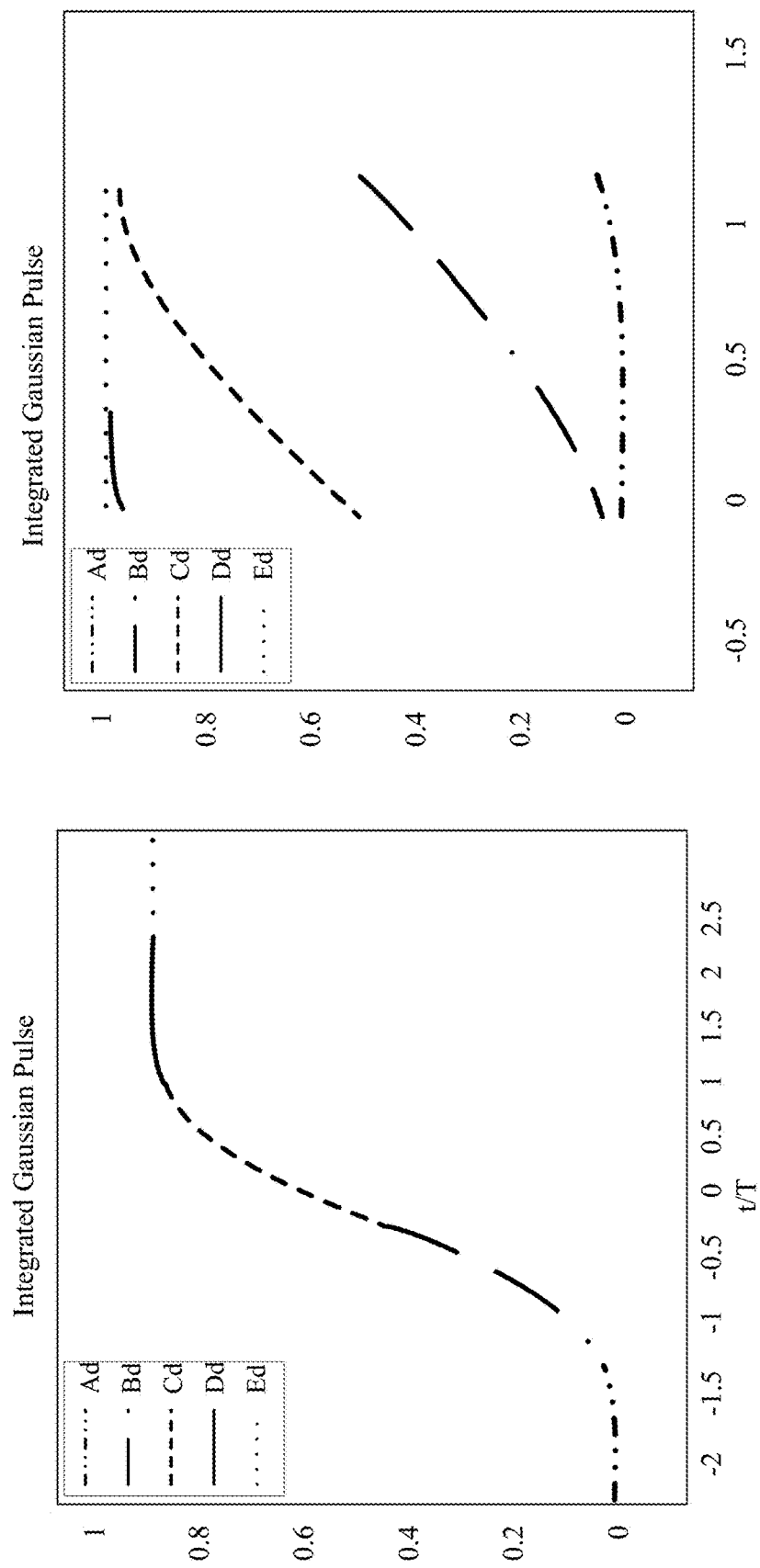
FIG. 6 is a graph of amplitude with respect to time (in sampling rate units) for an example integrated Gaussian pulse, according to some aspects.
FIG. 7 is a graph of amplitude with respect to time (in sampling rate units) for an example piecewise view of an integrated Gaussian pulse, according to some aspects.

FIG. 5 includes an example of a Gaussian pulse "g(u)" 500 as a function of "t/T," and FIG. 6 includes a corresponding integrated Gaussian pulse $$\text{"}\int_{-\infty}^{t-kT} g(u)\,du\text{"}$$

600 as a function of "t/T." Specifically, the integrated Gaussian pulse $$\text{"}\int_{-\infty}^{t-kT} g(u)\,du\text{"}$$

600 includes five sections "A(δ)," "B(δ)," "C(δ)," "D(δ)," and "E(δ)," where "δ" is the sampling rate time error: "0≤δ<T" due to the receiver not being synchronized with the GSM cell. FIG. 7 includes a piecewise view 700 of the integrated Gaussian pulse $$\text{"}\int_{-\infty}^{t-kT} g(u)\,du\text{"}$$

600 where each of the five sections "A(δ)," "B(δ)," "C(δ)," "D(δ)," and "E(δ)" are shifted to the same time window.

Given "φ(t)" above, "φ(t+T)" may be written as:

$$\phi(t+T) = \frac{\pi}{2} \sum_{k=-\infty}^{k=\infty} \alpha[k] \int_{-\infty}^{t-kT+T} g(u)du$$

and the first order difference of the phase "Dφ(n, δ)" may therefore be obtained as:

$$D\phi(n, \delta) \triangleq \phi((n+1)T + \delta) - \phi(nT + \delta)$$

$$D\phi(n, \delta) = \frac{\pi}{2} \sum_{k=n-1}^{k=n+2} \alpha[k] \int_{nT+\delta-kT}^{nT+\delta-kT+T} g(u)du$$

$$D\phi(n, \delta) = \frac{\pi}{2} \begin{Bmatrix} \alpha[n-1][E(\delta) - D(\delta)] + \\ \alpha[n][D(\delta) - C(\delta)] + \\ \alpha[n+1][C(\delta) - B(\delta)] + \\ \alpha[n+2][B(\delta) - A(\delta)] \end{Bmatrix}$$

Further, the second order difference of the phase "D²φ(n, δ)" may be obtained as:

$$D^2\phi(n, \delta) = \Delta D\phi(n + L\delta) - D\phi(n, \delta)$$

$$D^2\phi(n, \delta) = \frac{\pi}{2} \begin{Bmatrix} \alpha[n+3][B(\delta) - A(\delta)] + \\ \alpha[n+2][C(\delta) - 2B(\delta) + A(\delta)] + \\ \alpha[n+1][D(\delta) - 2C(\delta) + B(\delta)] + \\ \alpha[n][E(\delta) - 2D(\delta) + C(\delta)] - \\ \alpha[n-1][E(\delta) - D(\delta)] \end{Bmatrix}$$

Figure 8:
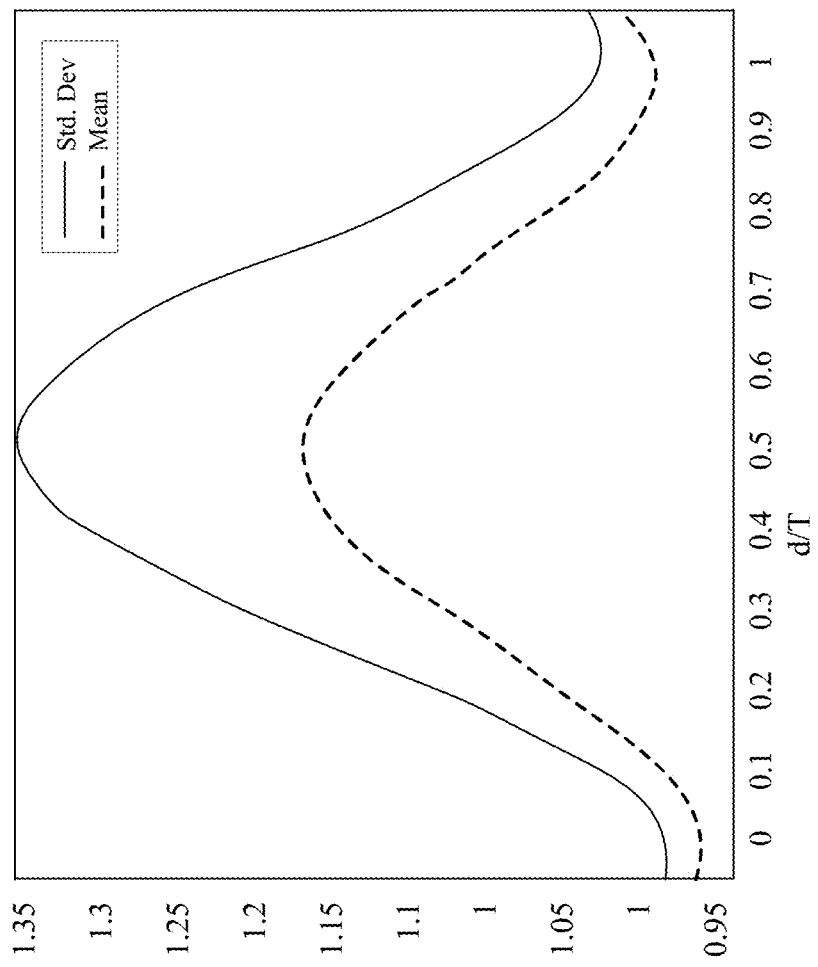
FIG. 8 is a graph of amplitude (in radians) with respect to sampling rate time error (in sampling rate units) for example mean and variance values of the square of the second order difference of the phase of a random symbol stream with GMSK modulation, according to some aspects.
Figure 9:
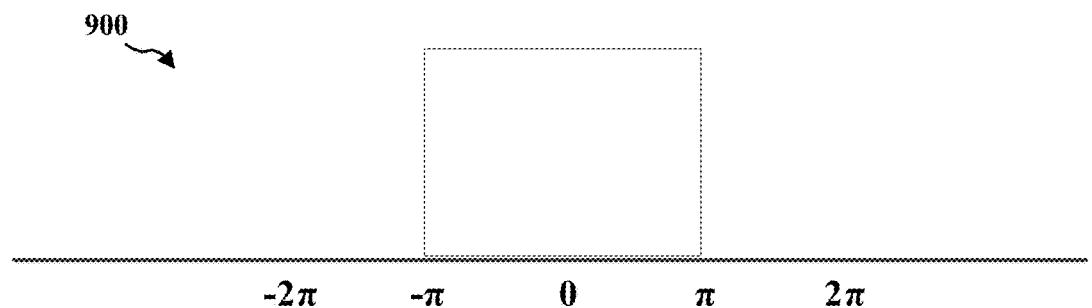
FIG. 9 is a graph of probability distribution with respect to phase (in radians) for the phase distribution of a white Gaussian noise (WGN) signal, according to some aspects.
Figure 10:
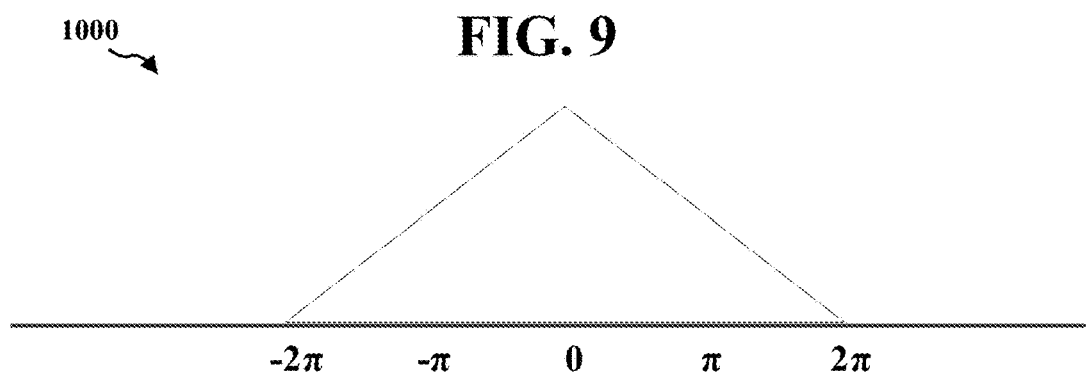
FIG. 10 is a graph of probability distribution with respect to phase (in radians) for an example distribution of the first order difference of the phase of a WGN signal, according to some aspects.
Figure 11:
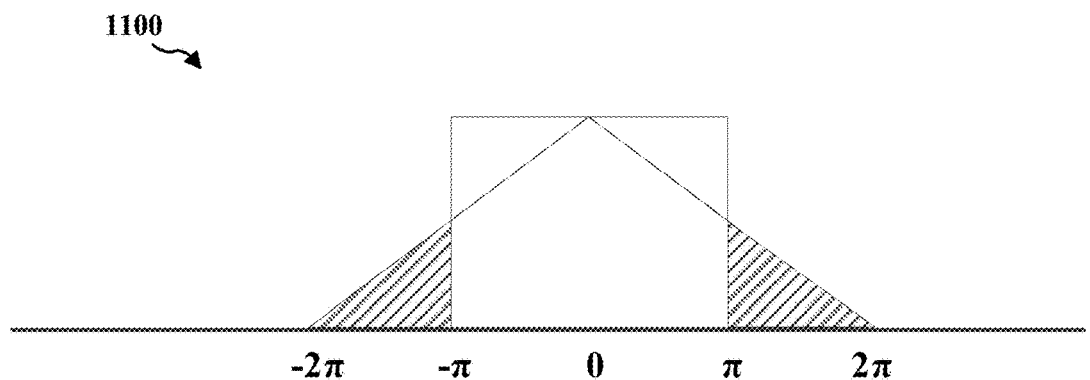
FIG. 11 is a graph of probability distribution with respect to phase (in radians) for an example wrapped distribution of the first order difference of the phase of a WGN signal, according to some aspects.

It should be noted that taking the second order difference of the phase cancels any frequency offset (e.g., few kHz) and/or Doppler shift, which is beneficial since the UE 104 may not have access to an accurate estimate of the frequency offset during band scan. FIG. 8 includes an example mean and variance 800 of the square of the second order difference of the phase "D²φ(n, δ)" in radians as a function of "δ/T" for a random symbol stream. In FIG. 8, the value of the mean of the square of the second order difference of the phase "D²φ(n, δ)" is between ~0.95 and ~1.15 radians, and the value of the variance of the square of the second order difference of the phase "D²φ(n, δ)" is between ~1 and ~1.35 radians.

FIGS. 9-12 include example phase properties for an OFDM signal. Specifically, at a GSM receiver, such as a GSM Enhanced Data rates for GSM Evolution (EDGE) Radio Access Network (GERAN) receiver, received OFDM signals may be modeled as white Gaussian noise (WGN). Since the distribution 900 of the phase (see FIG. 9) for a WGN signal is uniform, the distribution 1000 of the first order difference of the phase "Dφ(n, δ)" (see FIG. 10) is triangular. Therefore, the wrapped distribution 1100 of the first order difference of the phase "Dφ(n, δ)" (see FIG. 11) is again uniform. Consequently, the distribution 1200 of the second order difference of the phase "D²φ(n, δ)" (see FIG. 12) is again triangular. For such a distribution, the variance of the square of the second order difference of the phase "D²φ(n, δ)" may be obtained to be, for example, 6.58 radians, which is considerably higher than the value of the variance of the square of the second order difference of the phase "D²φ(n, δ)" for a GMSK signal which is between ~1 and ~1.35 radians. Therefore, in an aspect, the signal property detection component 146 in UE 104 may use the square of the second order difference of the phase "D²φ(n, δ)" as a metric to differentiate between a GMSK signal and any other signal with a uniform noise distribution when received by a GSM receiver, such as an OFDM signal.

Figure 13:
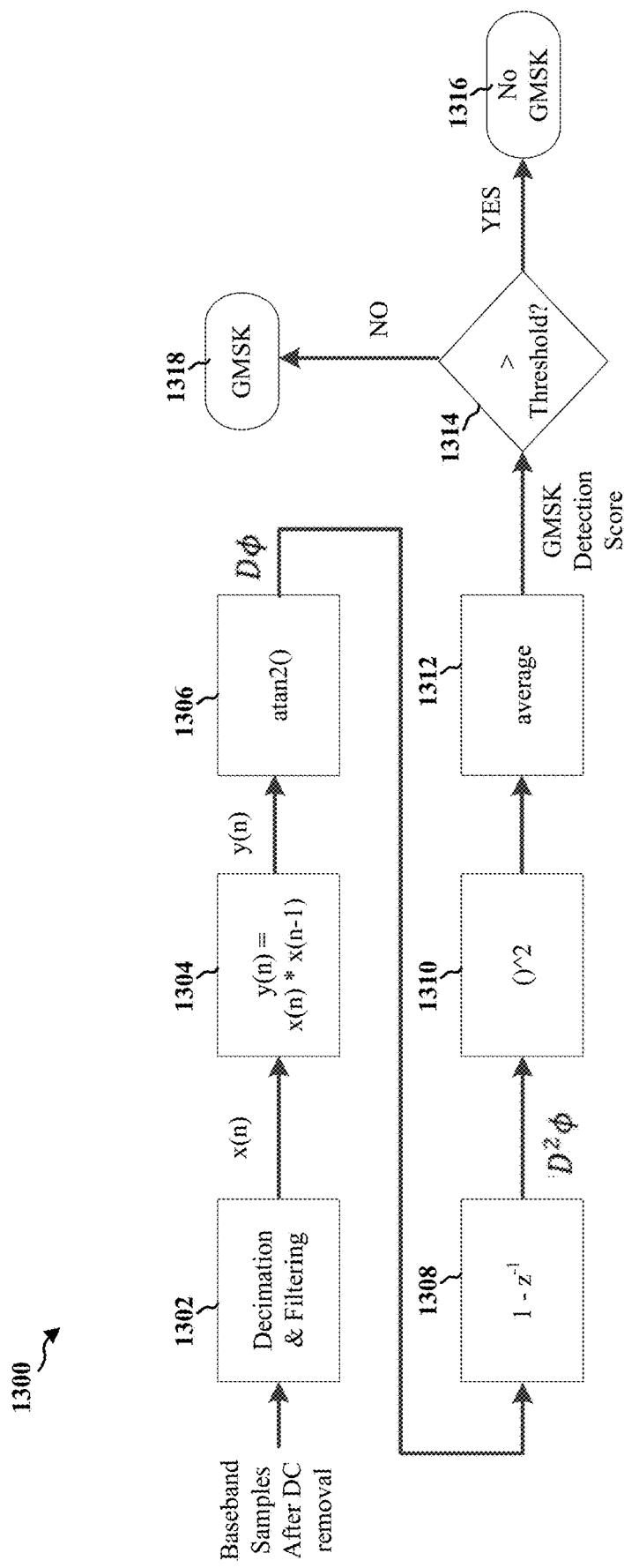
FIG. 13 is a block diagram of an example implementation of a fast GMSK signal detection algorithm, according to some aspects.

Referring to FIG. 13, an example implementation of a fast GMSK signal detection algorithm 1300 may be implemented by the signal property detection component 146 of UE 104 to detect the presence of a GMSK signal based on the second order difference of the phase of a received signal. At 1302 the signal property detection component 146 may perform decimation and filtering on baseband samples of a received signal after DC component removal, to bring the bandwidth of the signal to the GSM bandwidth and obtain samples "x(n)." At 1304 the signal property detection component 146 may obtain the differential phase "y(n)" as the product of "x(n)*" with "x(n−1)." At 1306 the signal property detection component 146 may obtain the wrapped first order difference of the phase "Dφ" of the received signal by applying the "atan 2( )" function to "y(n)," where "atan 2( )" of a complex vector returns the angle of the complex vector with the horizontal axis. The "atan 2( )" function also wraps the first order difference of the phase within the area between "−π" and "+π."

At 1308 the signal property detection component 146 may obtain the second order difference of the phase "D² φ" by applying the "1-Z⁻¹" filter to "Dφ" in the frequency domain, where "1-Z⁻¹" corresponds to the "Z" transform of the filter. At 1310 the signal property detection component 146 may calculate the square of "D² φ" At 1312 the signal property detection component 146 may average the square of "D²φ" over a number of samples (e.g., samples collected over 200 us) to obtain a GMSK detection score. At 1314 the signal property detection component 146 may compare the GMSK detection score with a threshold. If the GMSK detection score is greater than the threshold, at 1316 the signal property detection component 146 may determine that no GMSK signal is present. Conversely, if the GMSK detection score is not greater than the threshold, at 1318 the signal property detection component 146 may determine that a GMSK signal is present.

Figure 12:
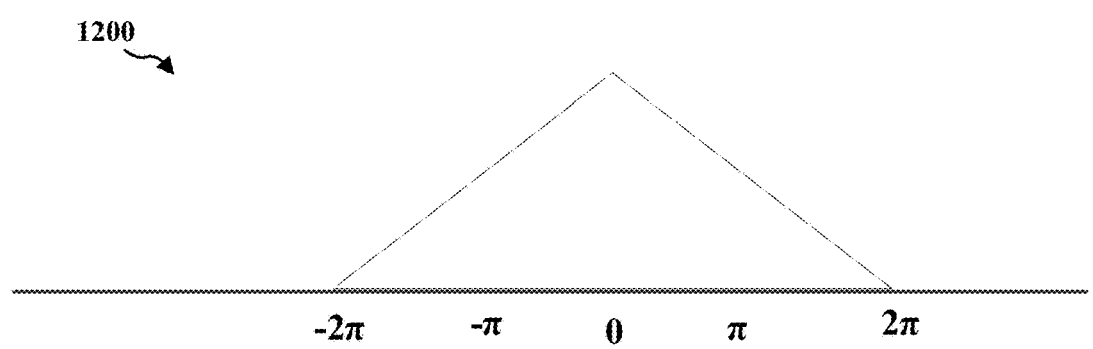
FIG. 12 is a graph of probability distribution with respect to phase (in radians) for an example distribution of the second order difference of the phase of a WGN signal, according to some aspects.

In an aspect, for example, the value of the threshold may be determined based on the mean and/or standard deviation values described herein with reference to FIGS. 8 and 12. The value of the threshold may then be fine-tuned based on samples received under various interference scenarios to achieve an acceptable probability of false alarm GSM detection rate and/or an acceptable missed GSM detection rate depending on each specific application. For example, in an aspect, a low probability of false alarm GSM detection may be required, while some missed GSM detection may be acceptable. On the contrary, in some other example aspects, a low probability of missed GSM detection may be required, while some false alarm GSM detection may be tolerable. Accordingly, in an aspect, for example, the value of the threshold may be implementation/application specific, and may be selected to achieve a tradeoff between the probability of missed GSM detection versus the probability of false alarm GSM detection.

Figure 14:
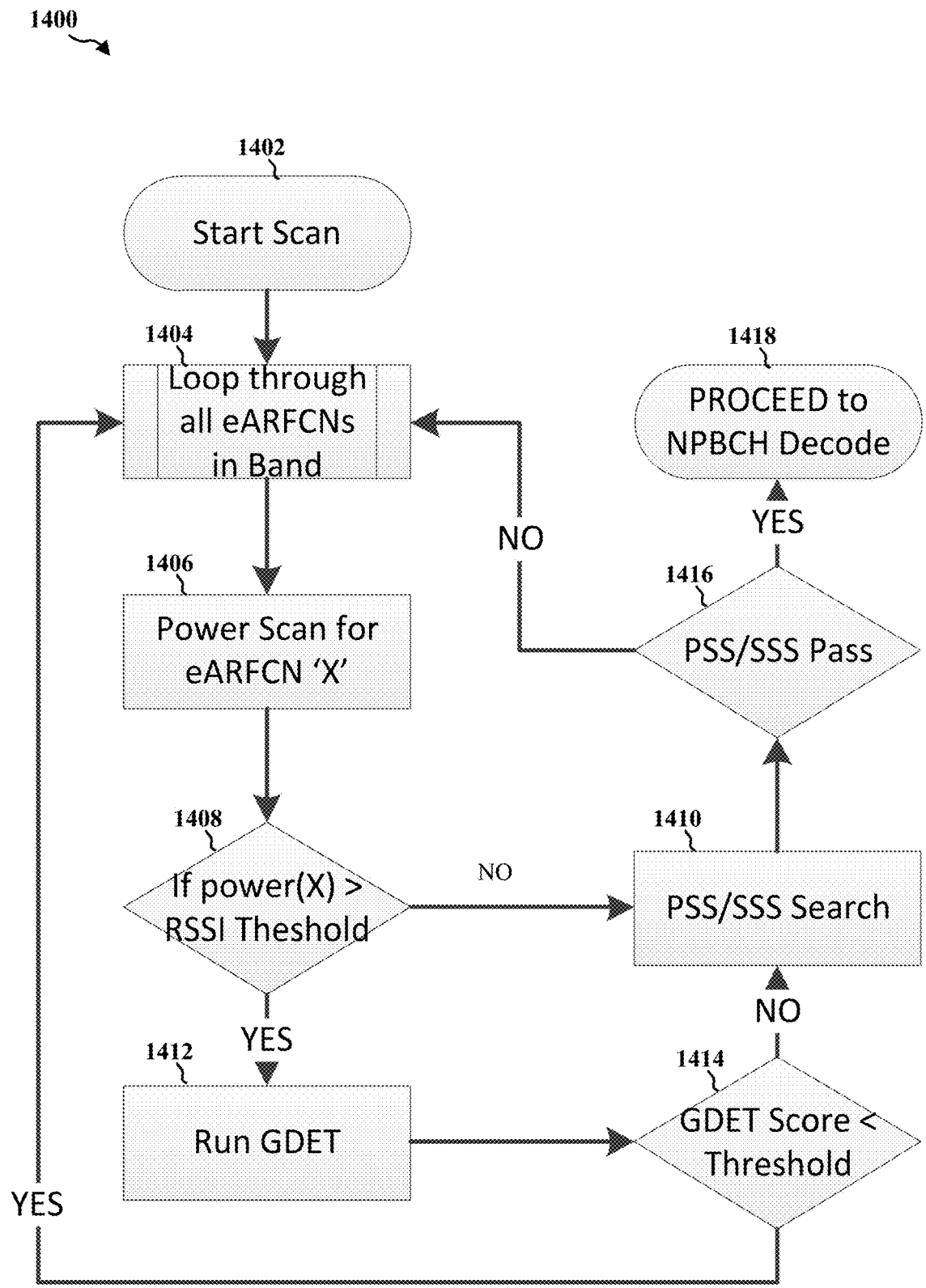
FIG. 14 is a flowchart of an example method of narrowband communication, according to some aspects.

Referring to FIG. 14, an example of a band scan algorithm 1400 may be implemented at the UE 104 by the channel scan component 142 of the narrowband communication component 140. At 1402 the channel scan component 142 starts scanning a frequency band for narrowband communication.

At 1404 the channel scan component 142 loops through the ARFCNs/EARFCNs in the frequency band that is being scanned. For each ARFCN/EARFCN, at 1406 the channel scan component 142 performs a power scan to determine the signal power in that ARFCN/EARFCN. At 1408 the channel scan component 142 compares the signal power in the ARFCN/EARFCN with an RSSI threshold. If the signal power in the ARFCN/EARFCN is greater than the RSSI threshold, at 1412 the signal property detection component 146 of the channel scan component 142 executes the GMSK signal detection algorithm described above with reference to FIG. 13 to generate a GMSK signal detection score for the ARFCN/EARFCN.

However, if the signal power in the ARFCN/EARFCN is less than the RSSI threshold, it may not be possible to detect any GSM signals present at the ARFCN/EARFCN. Therefore, at 1410 the channel scan component 142 proceeds with a synchronization signal search (e.g., a PSS or RSS search) on the ARFCN/EARFCN. Specifically, for example, when the GSM signal has an SNR that is less than 0 db, the phase characteristics of the noise in the ARFCN/EARFCN may mask the phase characteristics of the GSM signal in the ARFCN/EARFCN, thus rendering the phase characteristics of the GSM signal undetectable. Accordingly, for narrowband communications such as NB-IoT which are generally configured to accommodate poor coverage conditions, the threshold on RSSI ensures that GMSK signal detection at 1412 is performed/enabled only in strong signal conditions where GMSK signal detection is possible by observing the phase characteristics of the signal in the ARFCN/EARFCN as described herein.

At 1414 the channel scan component 142 compares the generated GMSK signal detection score with a threshold. A low GMSK signal detection score is indicative of a strong GSM signal. Accordingly, if the GMSK signal detection score is less than the threshold, the channel scan component 142 skips the synchronization signal search at 1410, and may loop back to 1404 to initiate the scan of a different ARFCN/EARFCN. In an aspect, for example, detection of the GMSK signal in the ARFCN/EARFCN and the early termination of the scan of the ARFCN/EARFCN may save, for example, at least ~29 ms and up to ~500 ms per every GMSK signal detection.

If at 1414 the channel scan component 142 determines that the GMSK signal detection score is greater than the threshold, the channel scan component 142 proceeds to 1410 to perform the synchronization signal search on the ARFCN/EARFCN. At 1416 the channel scan component 142 determines whether the synchronization signal search on the ARFCN/EARFCN has been successful. If the synchronization signal search on the ARFCN/EARFCN has not been successful, the channel scan component 142 may loop back to 1404 to try a different ARFCN/EARFCN. If the synchronization signal search on the ARFCN/EARFCN has been successful, at 1418 the channel scan component 142 proceeds with decoding a Narrowband Physical Broadcast Channel (NPBCH) at the ARFCN/EARFCN to perform narrowband communication.

In an alternative aspect, optionally, initiating the synchronization signal search on the ARFCN/EARFCN may not be dependent on the outcome of the power scan on the ARFCN/EARFCN. Instead, the channel scan component 142 may start the synchronization signal search on the ARFCN/EARFCN substantially at the same time as starting the power scan on the ARFCN/EARFCN. Again, if the power scan indicates an RSSI that is greater than a threshold, the signal property detection component 146 of the channel scan component 142 may execute the GMSK signal detection algorithm to generate a GMSK signal detection score for the ARFCN/EARFCN. If the GMSK signal detection score indicates that a GSM signal is present, the channel scan component 142 aborts the ongoing synchronization signal search on the ARFCN/EARFCN, and may try scanning another ARFCN/EARFCN for narrowb and communication.

In another alternative aspect, optionally, the channel scan component 142 may initiate both the GMSK signal detection algorithm and the synchronization signal search on the ARFCN/EARFCN irrespective of the RSSI value of the ARFCN/EARFCN. For example, the channel scan component 142 may not perform any power scan on the ARFCN/EARFCN, and may instead start the synchronization signal search on the ARFCN/EARFCN substantially at the same time as executing the signal property detection component 146 to generate a GMSK signal detection score for the ARFCN/EARFCN. If the GMSK signal detection score indicates that a GSM signal is present, the channel scan component 142 aborts the ongoing synchronization signal search on the ARFCN/EARFCN, and may try scanning another ARFCN/EARFCN for narrowband communication.

In a further alternative aspect, optionally, the channel scan component 142 may not perform any power scan on the ARFCN/EARFCN, and may instead always execute the signal property detection component 146 to generate a GMSK signal detection score for each ARFCN/EARFCN. If the GMSK signal detection score indicates that a GSM signal is not present, the channel scan component 142 may proceed to initiate a synchronization signal search on the ARFCN/EARFCN. Otherwise, the channel scan component 142 may try scanning another ARFCN/EARFCN for narrowband communication.

Optionally, in an aspect, an NB-IoT cell may be deployed such that it is "sandwiched" between GSM cells. In this case, a UE which does not employ the aforementioned GSM signal detection may take substantially the same time to camp/scan whether: (1) the GSM signals are present, or (2) the GSM signals are not present but there is WGN of similar power as the GSM signals. However, a UE that employs the aforementioned GSM signal detection may camp faster when the GSM signals are present as compared to when there is just WGN of similar power as the GSM signals.

In an aspect, the second order difference of the phase is a reliable metric which is independent of frequency error. In an aspect, the second order difference of the phase may have a very high spread for WGN signals, OFDM signals, and CDMA signals. Accordingly, the second order difference of the phase may be observed as a differentiating signal characteristic for signals with continuous phase modulation schemes such as GMSK, as well as for pure tone signals.

Figure 15:
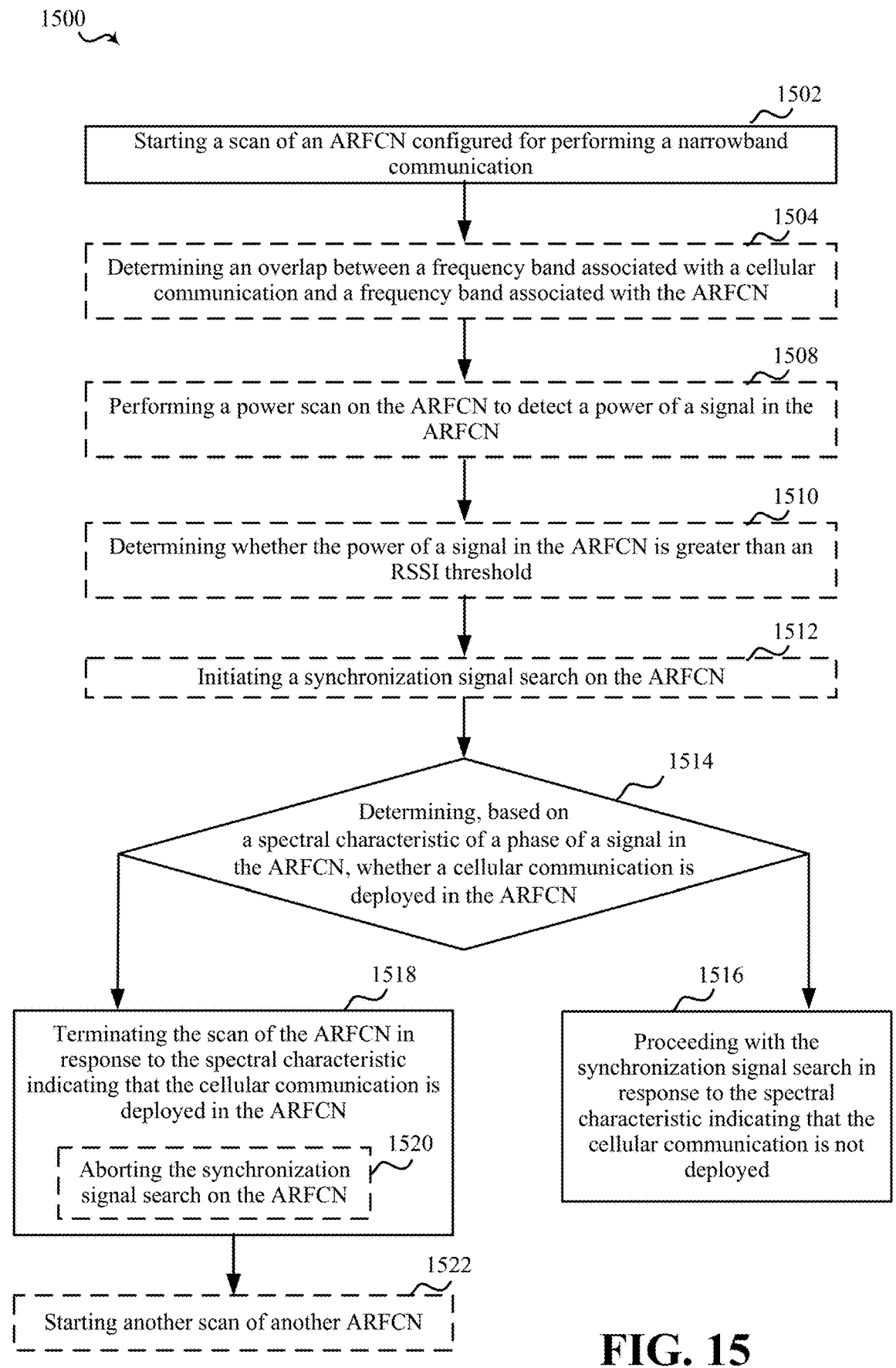
FIG. 15 is a flowchart of an example method of band scan for narrowband communication, according to some aspects.
Figure 16:
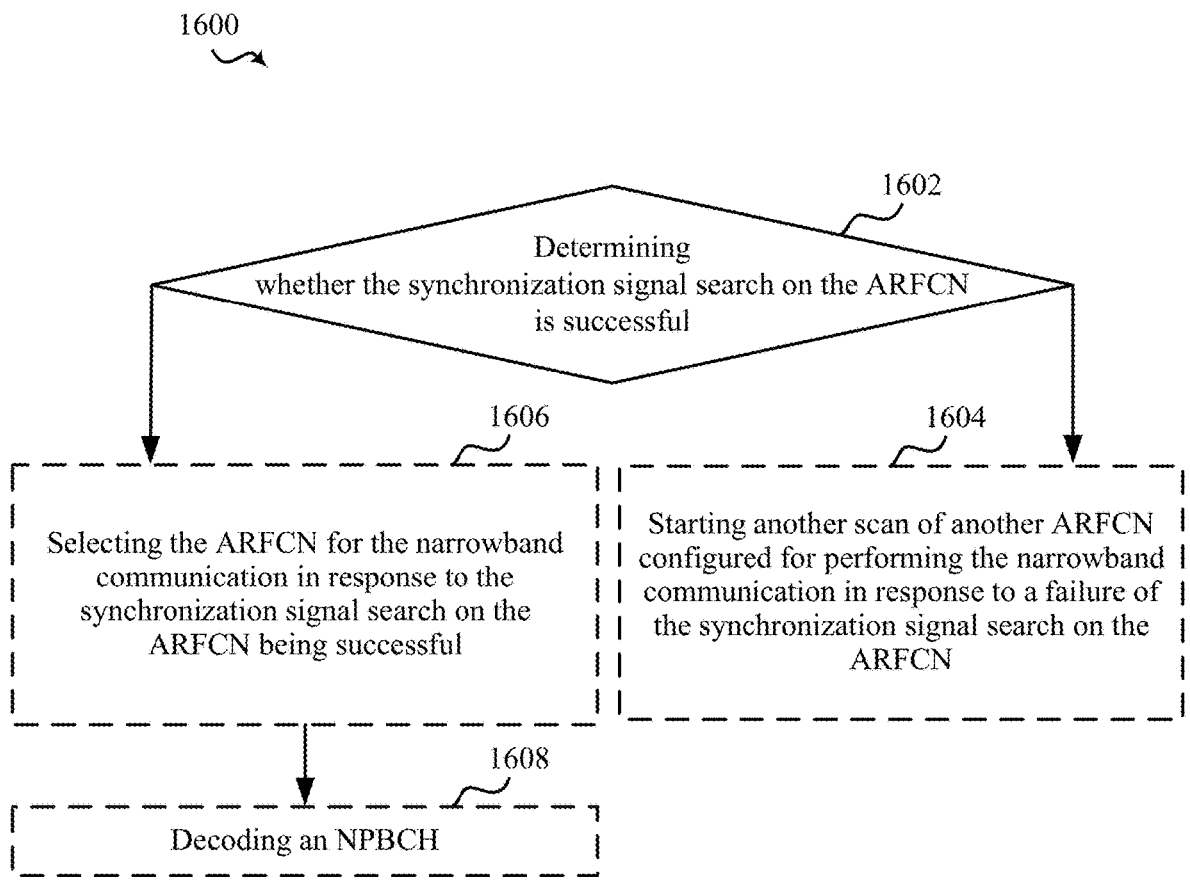
FIG. 16 is a flowchart of an example method of synchronization signal search for narrowband communication, according to some aspects.

Referring to FIGS. 15-17, example methods 1500, 1600, 1700 of wireless communication for performing narrowband communication in the small cell 102' may be performed by an apparatus such as the UE 104, or more particularly, by the narrowband communication component 140 being executed by a processor 812 as described herein with reference to FIG. 18 below.

Referring first to FIG. 15, at block 1502, the method 1500 includes starting a scan of an ARFCN configured for performing a narrowband communication. For example, in an aspect, the channel scan component 142 of the narrowband communication component 140 of a the UE 104 may start a scan of an ARFCN configured for performing a narrowband communication at small cell 102'. In an aspect, for example, the channel scan component 142 may start the scan in order to identify an appropriate ARFCN for the UE 104 to perform narrowband communication at small cell 102'.

Optionally, at block 1504, the method 1500 may further include determining an overlap between a frequency band associated with the cellular communication and a frequency band associated with the ARFCN. For example, in an aspect, the channel scan component 142 may determine an overlap between a frequency band associated with a cellular communication, such as a GSM communication, and a frequency band associated with the ARFCN. Such overlap may be known at the UE 104 a priori. For example, in an aspect, a look up table or other stored information at the UE 104 may identify one or more frequency bands configured for narrowband communication and one or more frequency bands configured for cellular communication. In this case, the channel scan component 142 may use the stored frequency band information to determine whether the ARFCN that is being scanned has any overlap with a cellular communication frequency band.

Optionally, at block 1508, the method 1500 may include performing a power scan on the ARFCN to detect a power of the signal in the ARFCN. For example, in an aspect, the channel scan component 142 may perform a power scan on the ARFCN to detect a power of the signal in the ARFCN. For example, in an aspect, performing a power scan on an ARFCN may include: tuning to the ARFCN; capturing samples over single or multiple short time windows; filtering the samples to limit the samples within a bandwidth of interest (e.g., GSM: 200 kHz); and measuring the received energy over the filtered samples and computing the received power. The power may be averaged over multiple time windows.

Optionally, at block 1510, the method 1500 may further include determining whether the power of the signal in the ARFCN is greater than an RSSI threshold. For example, in an aspect, the channel scan component 142 may determine whether the power of the signal in the ARFCN is greater than an RSSI threshold. For example, in an aspect, the UE 104 may have stored information identifying the RSSI threshold, and the channel scan component 142 may compare the power of the signal in the ARFCN with the stored RSSI threshold. In an aspect, for example, the RSSI threshold may relate to an amount of power in the received signal corresponding to the signal being suitably strong enough to be relied upon for communications.

Optionally, at block 1512, the method 1500 may include initiating a synchronization signal search on the ARFCN in response to the power of the signal in the ARFCN being less than the RSSI threshold. For example, in an aspect, the channel scan component 142 may initiate a synchronization signal search on the ARFCN in response to the power of the signal in the ARFCN being less than the RSSI threshold. However, in some alternative aspects, the channel scan component 142 may initiate the synchronization signal search on the ARFCN irrespective of what the value of the power of the signal in the ARFCN is. In an aspect, for example, the channel scan component 142 may execute a synchronization signal search algorithm configured to use timing and/or pulse shape properties of one or more known synchronization signals to decide whether any of such synchronization signals are being communicated in the ARFCN. Optionally, in an aspect, the synchronization signal search on the ARFCN may include at least one of a PSS scan or an SSS scan on the ARFCN.

At 1514, the method 1500 may further include determining, based on a spectral characteristic of a phase of the signal, whether a cellular communication is deployed in the ARFCN. For example, in an aspect, the channel scan component 142 may determine, based on a spectral characteristic of a phase of the signal, whether a cellular communication is deployed in the ARFCN. For example, in an aspect, only the phase of a specific cellular communication signal may have such a spectral characteristic, and therefore the channel scan component 142 may examine such a spectral characteristic in order to differentiate the cellular communication from noise and/or other type of communication. For example, optionally, in an aspect, the spectral characteristic of the phase of the signal in the ARFCN may be a second order difference of the phase of the signal in the ARFCN. For example, in an aspect, as described herein with reference to FIGS. 8 and 12, the square of the second order difference of the phase of the signal may be used as a metric to differentiate between a GMSK signal and any other signal with a uniform noise distribution when received by a GSM receiver, such as an OFDM signal.

Optionally, in an aspect, the spectral characteristic of the phase of the signal in the ARFCN may be an average over a number of samples of a square of a second order difference of the phase of the signal in the ARFCN. For example, in an aspect, the signal property detection component 146 of the channel scan component 142 may use a fast algorithm, for example, as described herein with reference to FIG. 13, to determine an average over a number of samples of a square of a second order difference of the phase of the signal in the ARFCN. For example, in an aspect, the signal property detection component 146 may obtain the second order difference of the phase of the signal in the ARFCN (1302-1308 in FIG. 13), then square the second order difference of the phase of the signal in the ARFCN (1310 in FIG. 13), and then average the square of the second order difference of the phase of the signal in the ARFCN over a number of samples (1312 in FIG. 13). Further details related to determining whether the cellular communication is deployed in the ARFCN are described below with reference to method 1700 in FIG. 17.

Optionally, at least the determining of whether the cellular communication is deployed in the ARFCN is performed in response to the determining of the overlap. For example, in an aspect, the channel scan component 142 may determine whether the cellular communication is deployed in the ARFCN in response to determining an overlap between a frequency band associated with a cellular communication, such as a GSM communication, and a frequency band associated with the ARFCN at block 1504. In an aspect, for example, a cellular communication may be expected only in certain frequency bands configured for such a communication, for example, according to corresponding standards. If a cellular communication cell is deployed in such frequency bands, the lengthy synchronization signal search for narrowband communication on those bands may fail. Therefore, if there is an overlap between a frequency band associated with a cellular communication and a frequency band associated with the ARFCN, the channel scan component 142 may perform the band scan more efficiently by quickly detecting the presence of the cellular communication cell. However, if there is no overlap between a frequency band associated with a cellular communication and a frequency band associated with the ARFCN, a cellular communication signal may not be expected on the ARFCN, and hence the channel scan component 142 may not need to examine the presence of the cellular communication cell. Accordingly, the channel scan component 142 may execute block 1514 and one or more other blocks of the method 1500, such as 1508, and 1510, only in response to determining an overlap between a frequency band associated with a cellular communication, such as a GSM communication, and a frequency band associated with the ARFCN at block 1504.

Optionally, the determining of whether the cellular communication is deployed in the ARFCN is performed in response to the power of the signal in the ARFCN being greater than the RSSI threshold. For example, in an aspect, optionally, the channel scan component 142 may execute block 1514 to determine whether the cellular communication is deployed in the ARFCN in response to the outcome of block 1510 indicating that the power of the signal in the ARFCN is greater than the RSSI threshold. For example, in an aspect, when there is a GSM signal in an ARFCN with an SNR that is less than 0 db, the phase characteristics of the noise in the ARFCN may mask the phase characteristics of the GSM signal, thus rendering the phase characteristics of the GSM signal undetectable. As such, the threshold on RSSI ensures that GMSK signal detection is performed/enabled only in strong signal conditions where GMSK signal detection is possible by observing the phase characteristics of the signal. Accordingly, optionally, the channel scan component 142 may execute block 1514 only when the power of the signal in the ARFCN is greater than the RSSI threshold. However, in other alternative optional aspects, the channel scan component 142 may execute block 1514 to determine whether the cellular communication is deployed in the ARFCN irrespective of the value of the power of the signal in the ARFCN.

Optionally, at block 1518, the method 1500 may include terminating the scan of the ARFCN in response to the spectral characteristic of the phase of the signal in the ARFCN indicating that the cellular communication is deployed in the ARFCN. For example, in an aspect, optionally, in response to the spectral characteristic of the phase of the signal in the ARFCN indicating that the cellular communication is deployed in the ARFCN, the channel scan component 142 may terminate the scan of the ARFCN. For example, in an aspect, if a cellular communication cell is deployed in the ARFCN, the lengthy synchronization signal search for narrowband communication in the ARFCN may fail. Therefore, if the spectral characteristic of the phase of the signal in the ARFCN indicates that a cellular communication is deployed in the ARFCN, the channel scan component 142 may perform the band scan more efficiently by terminating the scan of the ARFCN. Optionally, at block 1520, the method 1500 may include aborting the synchronization signal search on the ARFCN. For example, in an aspect, optionally, the channel scan component 142 may abort the synchronization signal search on the ARFCN as part of terminating the scan of the ARFCN at block 1518.

Optionally, at block 1522, the method 1500 may include starting, subsequent to the terminating of the scan of the ARFCN, another scan of another ARFCN configured for performing the narrowband communication. For example, in an aspect, optionally, subsequent to the terminating of the scan of the ARFCN, the channel scan component 142 may start another scan of another ARFCN configured for performing the narrowband communication. Accordingly, if the scanned ARFCN is not suitable for narrowband communication due to a cellular communication cell being deployed therein, the channel scan component 142 may try one or more other ARFCNs for performing narrowband communication, and may start scanning such other ARFCNs.

Optionally, at block 1516, the method 1500 may include proceeding with a synchronization signal search on the ARFCN in response to the spectral characteristic of the phase of the signal in the ARFCN indicating that the cellular communication is not deployed in the ARFCN. For example, in an aspect, optionally, in response to the spectral characteristic of the phase of the signal in the ARFCN indicating that the cellular communication is not deployed in the ARFCN, the channel scan component 142 may proceed with a synchronization signal search on the ARFCN as described below with reference to method 1600 in FIG. 16. Accordingly, if the scanned ARFCN is suitable for narrowband communication due to no cellular communication cell being deployed therein, the channel scan component 142 may look for a synchronization signal in the ARFCN so that the UE 104 may synchronize with the small cell 102' to perform narrowband communication.

Specifically, at block 1602, the method 1600 includes determining whether the synchronization signal search on the ARFCN is successful. For example, in an aspect, the channel scan component 142 may determine whether the synchronization signal search on the ARFCN is successful. For example, in an aspect, the channel scan component 142 may determine whether the synchronization signal search has been able to detect a synchronization signal, such a PSS or an SS signal, transmitted by the small cell 102' on the ARFCN.

Optionally, at block 1604, the method 1600 may include starting another scan of another ARFCN configured for performing the narrowband communication in response to a failure of the synchronization signal search on the ARFCN. For example, in an aspect, optionally, in response to a failure of the synchronization signal search on the ARFCN, the channel scan component 142 may start another scan of another ARFCN configured for performing the narrowband communication. Accordingly, if the synchronization signal search has not been able to detect a synchronization signal, such a PSS or an SS signal, transmitted by the small cell 102' on the ARFCN, the ARFCN is not suitable for narrowband communication. In this case, the channel scan component 142 may try one or more other ARFCNs for performing narrowband communication, and may start scanning such other ARFCNs.

Optionally, at block 1606, the method 1600 may include selecting the ARFCN for the narrowband communication in response to the synchronization signal search on the ARFCN being successful. For example, in an aspect, optionally, in response to the synchronization signal search on the ARFCN being successful, the channel scan component 142 may select the ARFCN for the narrowband communication. Accordingly, if the synchronization signal search has been able to detect a synchronization signal, such a PSS or an SS signal, transmitted by the small cell 102' on the ARFCN, the ARFCN is suitable for narrowband communication. In this case, the channel scan component 142 may select the ARFCN for narrowband communication of the UE 104 in the small cell 102'.

Optionally, at block 1608, the method 1600 may further include decoding an NPBCH in response to the synchronization signal search on the ARFCN being successful. For example, in an aspect, optionally, in response to the synchronization signal search on the ARFCN being successful, the channel scan component 142 may further decode an NPBCH of the ARFCN. For example, in an aspect, an NPBCH corresponding to the NRFCN may include a master information block (MIB) that carries essential information for the UE 104 to perform narrowband communication in the small cell 102'. In this case, the channel scan component 142 may decode the NPBCH to obtain such essential information.

Referring now to FIG. 17, further details related to determining whether the cellular communication is deployed in the ARFCN are described below with reference to the method 1700. In an aspect, at least a portion of the method 1700 may be executed by the signal property detection component 146 of the channel scan component 142 to determine a characteristic of the phase of a signal detected on the ARFCN.

At block 1702, the method 1700 may include calculating a first order difference of the phase of the signal based on baseband samples of the signal. For example, in an aspect, the signal property detection component 146 of the channel scan component 142 may use baseband samples of the signal detected on the ARFCN to calculate a first order difference of the phase of the signal. For example, in an aspect, the phase of a cellular communication signal may have a specific spectral characteristic, and therefore the channel scan component 142 may execute the signal property detection component 146 to examine such a spectral characteristic in order to differentiate the cellular communication from noise and/or other type of communication. For example, as described above, the differentiating spectral characteristic of the phase of the signal may be a second order difference of the phase of the signal, and in order to obtain the second order difference of the phase of the signal, the signal property detection component 146 may first calculate the first order difference of the phase of the signal at block 1702.

Optionally, in an aspect, the baseband samples of the signal have a sampling rate associated with a bandwidth of the cellular communication. For example, in an aspect, the cellular communication may be a GSM communication, and determining the spectral characteristic of the GSM signal may require signal samples at a sampling rate within a bandwidth associated the GSM communication. In this case, the signal property detection component 146 may perform decimation and/or filtering to bring the sampling rate of the baseband signal to a sampling rate within a bandwidth associated the GSM communication, as described herein, for example, with reference to block 1302 in FIG. 13.

Optionally, block 1702 may include block 1704, and at block 1704 the method 1700 may include obtaining a product of a conjugate of each sample with a previous sample. For example, in an aspect, optionally, the signal property detection component 146 may calculate the first order difference of the phase of the signal by obtaining a product of a conjugate of each sample with a previous sample, as described herein, for example, with reference to block 1304 in FIG. 13. In this case, multiplying a conjugate of each sample with a previous sample results in a phase difference between each sample and a previous sample.

At block 1706, the method 1700 may include wrapping the first order difference of the phase of the signal to obtain a wrapped first order difference of the phase of the signal. For example, in an aspect, the signal property detection component 146 may wrap the first order difference of the phase of the signal to obtain a wrapped first order difference of the phase of the signal, as described herein, for example, with reference to block 1306 in FIG. 13. In an aspect, for example, such wrapping results in a better estimate of the first order phase difference of the signal, which may then be used to obtain the second order phase difference. For example, in an aspect, the wrapping may allow for better discrimination between a GSM signal and a WGN signal.

Optionally, block 1706 may include block 1708, and at block 1708 the method 1700 may include wrapping the first order difference of the phase of the signal to an area between −π and +π. For example, in an aspect, the signal property detection component 146 may wrap the first order difference of the phase of the signal to an area between −π and +π, as described herein, for example, with reference to block 1306 in FIG. 13. Accordingly, the wrapping provides a normalized phase difference between −π and +π.

At block 1710, the method 1700 may further include calculating the second order difference of the phase of the signal based on the wrapped first order difference of the phase of the signal. For example, in an aspect, the signal property detection component 146 may calculate the second order difference of the phase of the signal based on the wrapped first order difference of the phase of the signal, as described herein, for example, with reference to block 1308 in FIG. 13. For example, in an aspect, taking another difference of the first order differential phase of the signal results in the second order differential phase of the signal.

Optionally, block 1710 may include block 1712, and at block 1712 the method 1700 may include applying a frequency domain filter to the wrapped first order difference of the phase of the signal. For example, in an aspect, the signal property detection component 146 may calculate the second order difference of the phase of the signal by applying a frequency domain filter "$1-Z^{-1}$" to the wrapped first order difference of the phase of the signal, as described herein, for example, with reference to block 1308 in FIG. 13. In this case, the "$Z^{-1}$" correspond to a delay of one sample, and the frequency domain filter "$1-Z^{-1}$" calculates the difference between two consecutive first order differential phase samples.

At block 1714, the method 1700 may further include calculating the average over the number of samples of the square of the second order difference of the phase of the signal in the ARFCN. For example, in an aspect, the signal property detection component 146 may calculate the average over the number of samples of the square of the second order difference of the phase of the signal in the ARFCN, as described herein, for example, with reference to blocks 1310 and 1312 in FIG. 13. For example, in an aspect, the average over the number of samples of the square of the second order difference of the phase of the signal in the ARFCN may provide an estimate of the square of the second order difference of the phase of the signal, which may then be used as a detection score for differentiating a GSM signal with any other signal with a uniform noise distribution when received by a GSM receiver, such as an OFDM signal.

At block 1716, the method 1700 may further include comparing the average with a threshold. For example, in an aspect, the signal property detection component 146 may compare the average over the number of samples of the square of the second order difference of the phase of the signal in the ARFCN with a threshold, as described herein, for example, with reference to block 1314 in FIG. 13. For example, the variance of the square of the second order difference of the phase of a signal with a uniform noise distribution may be obtained to be, for example, 6.58 radians, which is considerably higher than the value of the variance of the square of the second order difference of the phase for a GMSK signal which is between ~1 and ~1.35 radians. Accordingly, comparing the average over the number of samples of the square of the second order difference of the phase of the signal in the ARFCN with a threshold may indicate whether the signal is a GSM signal or any other signal with a uniform noise distribution when received by a GSM receiver, such as an OFDM signal.

Optionally, at block 1718, the method 1700 may further include deciding that the cellular communication is not deployed in the ARFCN in response to the average being equal to or larger than the threshold. For example, in an aspect, optionally, in response to the average over the number of samples of the square of the second order difference of the phase of the signal in the ARFCN being equal to or larger than the threshold, the signal property detection component 146 may decide that the cellular communication is not deployed in the ARFCN, as described herein, for example, with reference to block 1316 in FIG. 13.

Optionally, at block 1720, the method 1700 may further include deciding that the cellular communication is deployed in the ARFCN in response to the average being smaller than the threshold. For example, in an aspect, optionally, in response to the average over the number of samples of the square of the second order difference of the phase of the signal in the ARFCN being smaller than the threshold, the signal property detection component 146 may decide that the cellular communication is deployed in the ARFCN, as described herein, for example, with reference to block 1318 in FIG. 13.

Optionally, in an aspect, the ARFCN may be an EARFCN. Optionally, in an aspect, the cellular communication may be a GSM communication. Optionally, in an aspect, the narrowband communication comprises NB-IoT communication.

Figure 18:
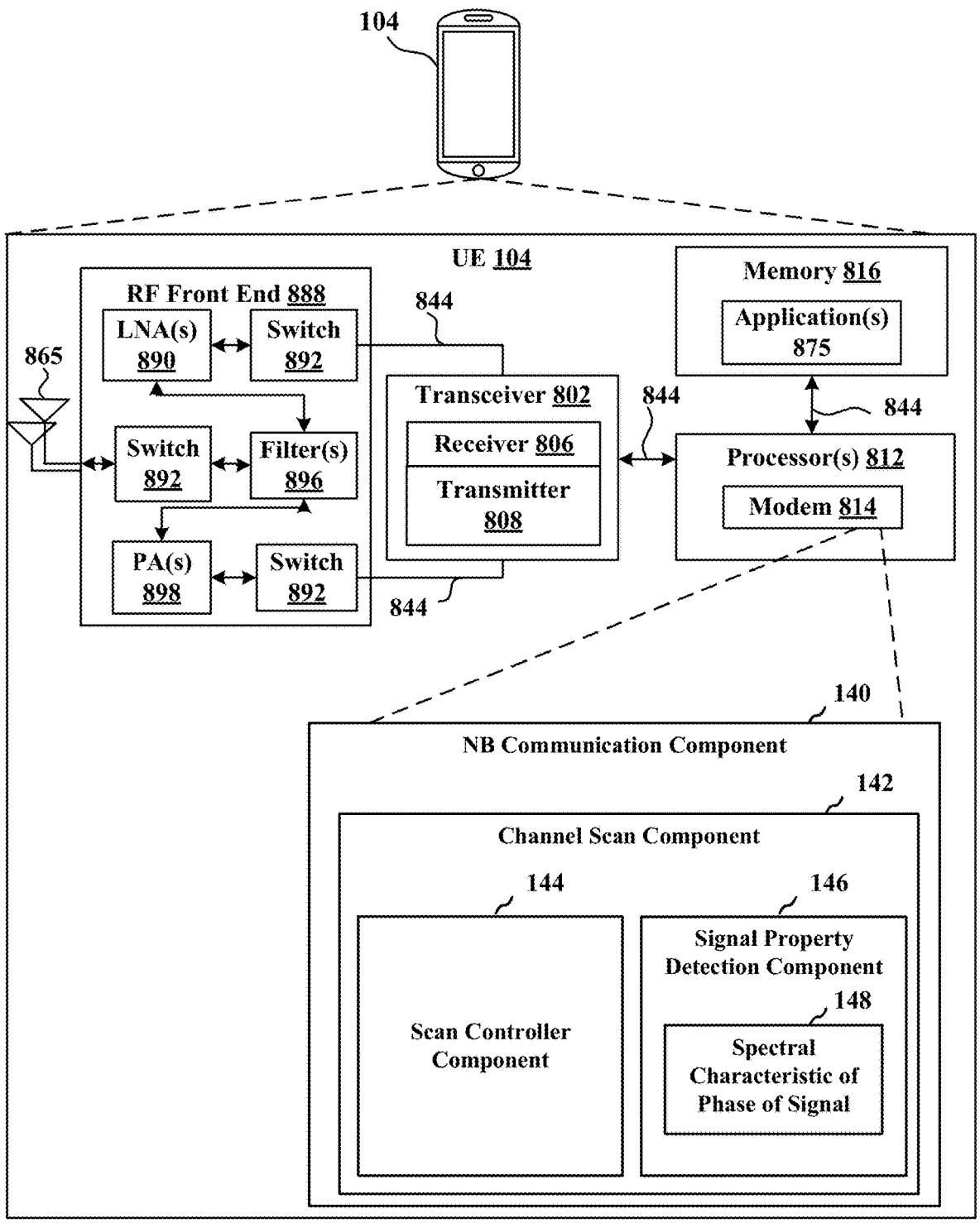
FIG. 18 is a schematic diagram of example components of the UEs of FIG. 1, according to some aspects.

Referring to FIG. 18, one example of an implementation of the UE 104, which may be performing narrowband communication in small cell 102', may include a variety of components, some of which have already been described above, but including components such as one or more processors 812 and memory 816 and transceiver 802 in communication via one or more buses 844, which may operate in conjunction with modem 814 and the narrowband communication component 140 to enable one or more of the functions described herein related to narrowband communication in the small cell 102'. Further, the one or more processors 812, modem 814, memory 816, transceiver 802, RF front end 888, and one or more antennas 865, may be configured to support voice and/or data calls (simultaneously or non-simultaneously) in one or more radio access technologies.

In an aspect, the one or more processors 812 can include a modem 814 that uses one or more modem processors. The various functions related to the narrowband communication component 140 may be included in modem 814 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with the narrowband communication component 140 may be performed by transceiver 802.

Also, memory 816 may be configured to store data used herein and/or local versions of applications 875, the narrowband communication component 140, and/or one or more of subcomponents thereof being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining the narrowband communication component 140, and/or one or more of subcomponents thereof, and/or data associated therewith, when UE 104 is operating at least one processor 812 to execute the narrowband communication component 140, and/or one or more subcomponents thereof.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102 or another UE 104. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may include, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and an associated specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 814 can configure transceiver 802 to operate at a specified frequency and power level based on the UE configuration of the UE 104 and the communication protocol used by modem 814.

In an aspect, modem 814 can be a multiband-multimode modem, which can process digital data and communicate with transceiver 802 such that the digital data is sent and received using transceiver 802. In an aspect, modem 814 can be multiband and be configured to support multiple frequency bands for a specific communications protocol. In an aspect, modem 814 can be multimode and be configured to support multiple operating networks and communications protocols. In an aspect, modem 814 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   starting a scan of an absolute radio frequency channel number (ARFCN) configured for performing a narrowband communication;
   determining, based on a spectral characteristic of a phase of a signal in the ARFCN, whether a cellular communication is deployed in the ARFCN;
   terminating the scan of the ARFCN in response to the spectral characteristic of the phase of the signal in the ARFCN indicating that the cellular communication is deployed in the ARFCN; and
   proceeding with a synchronization signal search on the ARFCN in response to the spectral characteristic of the phase of the signal in the ARFCN indicating that the cellular communication is not deployed in the ARFCN.

2. The method of claim 1, further comprising:
   starting, subsequent to the terminating of the scan of the ARFCN, another scan of another ARFCN configured for performing the narrowband communication.

3. The method of claim 1, further comprising:
   determining an overlap between a frequency band associated with the cellular communication and a frequency band associated with the ARFCN; and
   wherein at least the determining of whether the cellular communication is deployed in the ARFCN is performed in response to the determining of the overlap.

4. The method of claim 1, further comprising:
   performing a power scan on the ARFCN to detect a power of the signal in the ARFCN; and
   determining whether the power of the signal in the ARFCN is greater than a Received Signal Strength Indicator (RSSI) threshold.

5. The method of claim 4,
   wherein the determining of whether the cellular communication is deployed in the ARFCN is performed in response to the power of the signal in the ARFCN being greater than the RSSI threshold.

6. The method of claim 4, further comprising:
   initiating the synchronization signal search on the ARFCN in response to the power of the signal in the ARFCN being less than the RSSI threshold.

7. The method of claim 4,
   wherein the performing of the synchronization signal search on the ARFCN comprises performing at least one of a primary synchronization signal (PSS) scan or a secondary synchronization signal (SSS) scan on the ARFCN.

8. The method of claim 1,
   wherein the terminating comprises aborting the synchronization signal search on the ARFCN.

9. The method of claim 1, further comprising:
   determining whether the synchronization signal search on the ARFCN is successful;
   selecting the ARFCN for the narrowband communication in response to the synchronization signal search on the ARFCN being successful; and
   starting another scan of another ARFCN configured for performing the narrowband communication in response to a failure of the synchronization signal search on the ARFCN.

10. The method of claim 9, further comprising:
    decoding a Narrowband Physical Broadcast Channel (NPBCH) in response to the synchronization signal search on the ARFCN being successful.

11. The method of claim 1,
wherein the spectral characteristic of the phase of the signal in the ARFCN comprises a second order difference of the phase of the signal in the ARFCN.

12. The method of claim 1,
wherein the ARFCN comprises an E-UTRA ARFCN (EARFCN);
wherein the cellular communication comprises a Global System for Mobile communications (GSM) communication; and
wherein the narrowband communication comprises narrowband Internet-of-Things (NB-IoT) communication.

13. The method of claim 1,
wherein the spectral characteristic of the phase of the signal in the ARFCN comprises an average over a number of samples of a square of a second order difference of the phase of the signal in the ARFCN.

14. The method of claim 13, wherein the determining comprises:
comparing the average with a threshold;
deciding that the cellular communication is deployed in the ARFCN in response to the average being smaller than the threshold; and
deciding that the cellular communication is not deployed in the ARFCN in response to the average being equal to or larger than the threshold.

15. The method of claim 13, wherein the determining comprises:
calculating a first order difference of the phase of the signal based on baseband samples of the signal;
wrapping the first order difference of the phase of the signal to obtain a wrapped first order difference of the phase of the signal;
calculating the second order difference of the phase of the signal based on the wrapped first order difference of the phase of the signal; and
calculating the average over the number of samples of the square of the second order difference of the phase of the signal in the ARFCN.

16. The method of claim 15,
wherein the baseband samples of the signal have a sampling rate associated with a bandwidth of the cellular communication.

17. The method of claim 15,
wherein the calculating of the first order difference of the phase of the signal comprises obtaining a product of a conjugate of each sample with a previous sample; and
wherein the wrapping of the first order difference of the phase of the signal comprises wrapping the first order difference of the phase of the signal to an area between $-\pi$ and $+\pi$.

18. The method of claim 15,
wherein the calculating of the second order difference of the phase of the signal comprises applying a frequency domain filter to the wrapped first order difference of the phase of the signal.

19. A user equipment (UE) for wireless communication, comprising:
a memory; and
at least one processor coupled to the memory and configured to:
start a scan of an absolute radio frequency channel number (ARFCN) configured for performing a narrowband communication;
determine, based on a spectral characteristic of a phase of a signal in the ARFCN, whether a cellular communication is deployed in the ARFCN;
terminate the scan of the ARFCN in response to the spectral characteristic of the phase of the signal in the ARFCN indicating that the cellular communication is deployed in the ARFCN; and
proceed with a synchronization signal search on the ARFCN in response to the spectral characteristic of the phase of the signal in the ARFCN indicating that the cellular communication is not deployed in the ARFCN.

20. A computer-readable medium storing computer executable code, comprising code to:
start a scan of an absolute radio frequency channel number (ARFCN) configured for performing a narrowband communication;
determine, based on a spectral characteristic of a phase of a signal in the ARFCN, whether a cellular communication is deployed in the ARFCN;
terminate the scan of the ARFCN in response to the spectral characteristic of the phase of the signal in the ARFCN indicating that the cellular communication is deployed in the ARFCN; and
proceed with a synchronization signal search on the ARFCN in response to the spectral characteristic of the phase of the signal in the ARFCN indicating that the cellular communication is not deployed in the ARFCN.

* * * * *